United States Patent
Indelicato (10) Patent No.: US 11,740,871 B2
(45) Date of Patent: *Aug. 29, 2023

(54) BINARY PARALLEL ADDER AND MULTIPLIER

(71) Applicant: MICRON TECHNOLOGY, INC., Boise, ID (US)

(72) Inventor: Fabio Indelicato, Vimercate (IT)

(73) Assignee: MICRON TECHNOLOGY, INC., Boise, ID (US)

( * ) Notice: Subject to any disclaimer, the term of this patent is extended or adjusted under 35 U.S.C. 154(b) by 206 days.

This patent is subject to a terminal disclaimer.

(21) Appl. No.: 17/154,905

(22) Filed: Jan. 21, 2021

(65) Prior Publication Data

US 2021/0141605 A1    May 13, 2021

Related U.S. Application Data

(63) Continuation of application No. 16/237,104, filed on Dec. 31, 2018, now Pat. No. 10,901,694.

(51) Int. Cl.
| | |
|---|---|
| *G06F 7/57* | (2006.01) |
| *G06F 7/544* | (2006.01) |
| *G06F 7/53* | (2006.01) |
| *G06F 7/505* | (2006.01) |

(52) U.S. Cl.
CPC ............... *G06F 7/57* (2013.01); *G06F 7/505* (2013.01); *G06F 7/53* (2013.01); *G06F 7/5443* (2013.01)

(58) Field of Classification Search
CPC . G06F 7/5443; G06F 7/57; G06F 7/53; G06F 7/505
See application file for complete search history.

(56) References Cited

U.S. PATENT DOCUMENTS

| | | | |
|---|---|---|---|
| 2004/0010536 A1* | 1/2004 | Moreno | G06F 7/53 708/625 |
| 2005/0144215 A1 | 6/2005 | Simkins et al. | |
| 2006/0149803 A1 | 7/2006 | Siu et al. | |
| 2006/0230095 A1 | 10/2006 | Simkins et al. | |
| 2007/0266071 A1 | 11/2007 | Dockser et al. | |
| 2008/0243976 A1* | 10/2008 | Wiencke | G06F 7/5443 708/629 |
| 2008/0256161 A1 | 10/2008 | Eric et al. | |
| 2010/0312990 A1 | 12/2010 | Walker | |
| 2012/0182801 A1 | 7/2012 | Lue | |

(Continued)

*Primary Examiner* — Matthew D Sandifer
(74) *Attorney, Agent, or Firm* — Dorsey & Whitney LLP (57) ABSTRACT

An arithmetic logic unit (ALU) including a binary, parallel adder and multiplier to perform arithmetic operations is described. The ALU includes an adder circuit coupled to a multiplexer to receive input operands that are directed to either an addition operation or a multiplication operation. During the multiplication operation, the ALU is configured to determine partial product operands based on first and second operands and provide the partial product operands to the adder circuit via the multiplexer, and the adder circuit is configured to provide an output having a value equal to a product of the first operand second operands. During an addition operation, the ALU is configured to provide the first and second operands to the adder circuit via the multiplexer, and the adder circuit is configured to provide the output having a value equal to a sum of the first and second operands.

18 Claims, 6 Drawing Sheets

(56) References Cited

U.S. PATENT DOCUMENTS

2017/0237440 A1 8/2017 Zhang et al.
2017/0255390 A1 9/2017 Chang et al.
2019/0235780 A1 8/2019 Debenedictis

* cited by examiner

BINARY PARALLEL ADDER AND MULTIPLIER

CROSS-REFERENCE TO RELATED APPLICATION

This application is a continuation of U.S. patent application Ser. No. 16/237,104, filed Dec. 31, 2018 and issued as U.S. Pat. No. 10,901,694 on Jan. 26, 2021. The aforementioned application, and issued patent, is incorporated by reference herein in its entirety and for all purposes.

BACKGROUND OF THE INVENTION

High data reliability, high speed of memory access, low power, and reduced chip size are features that are demanded from semiconductor memory. In some applications, the memory device may include circuitry configured to perform basic arithmetic operations using data, addresses, or other information received at the memory from an external host or provided from the memory to the external host. However, the arithmetic circuitry may consume extra space on a chip of the memory device, and operation of the arithmetic circuitry may consume extra power as compared to devices that do not have the arithmetic circuitry.

DETAILED DESCRIPTION

Certain details are set forth below to provide a sufficient understanding of embodiments of the disclosure. However, it will be clear to one skilled in the art that embodiments of the disclosure may be practiced without these particular details. Moreover, the particular embodiments of the present disclosure described herein are provided by way of example and should not be used to limit the scope of the disclosure to these particular embodiments. In other instances, well-known circuits, control signals, timing protocols, and software operations have not been shown in detail in order to avoid unnecessarily obscuring the disclosure.

Figure 1:
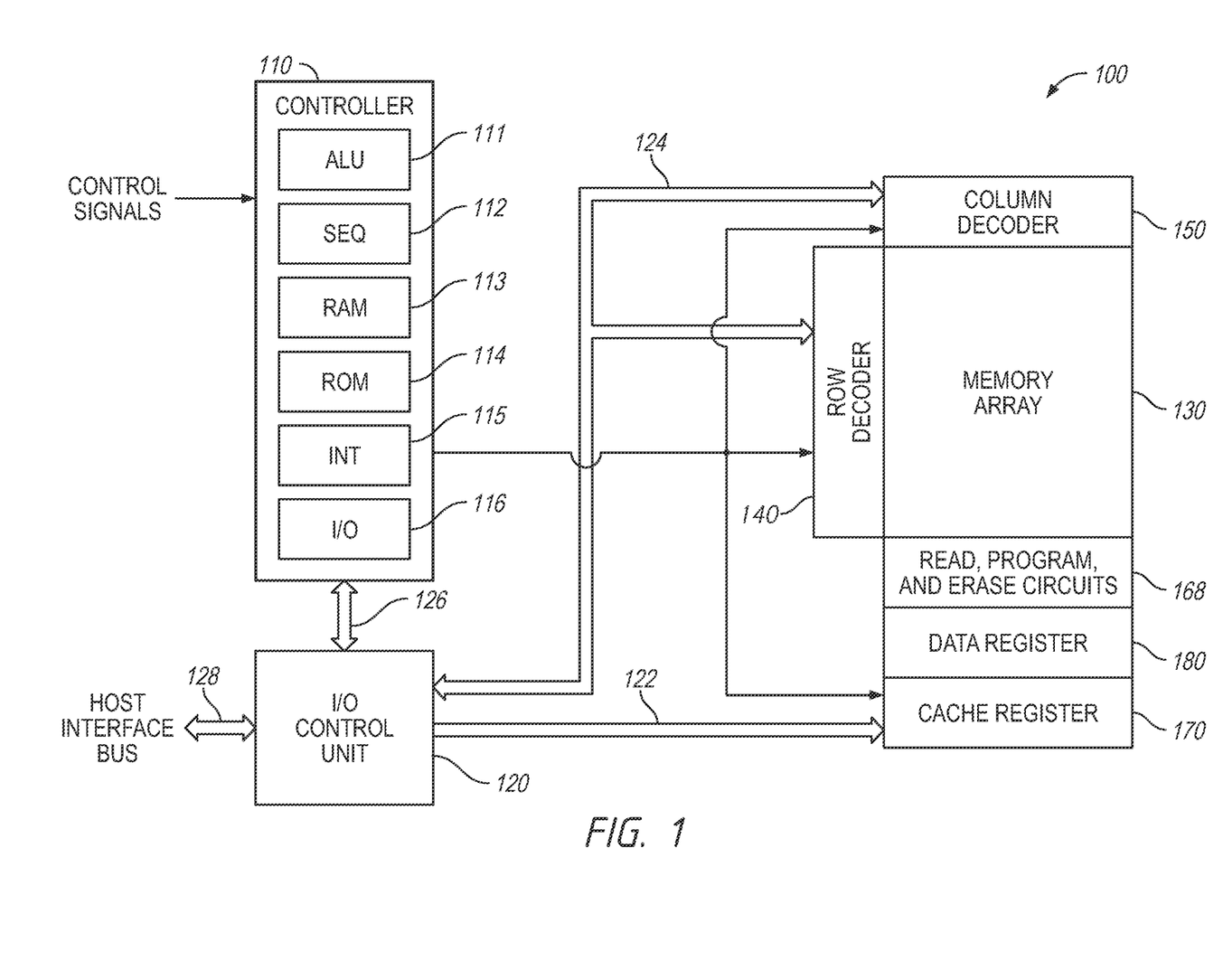
FIG. 1 is a block diagram of a memory in accordance with an embodiment of the disclosure.

FIG. 1 illustrates a memory 100 according to an embodiment of the present disclosure. The memory 100 includes a memory array 130 with a plurality of memory cells. The memory cells may be non-volatile memory cells, such as NAND flash cells, or may generally be any type of memory cells. In some embodiments, the memory 100 may be a three-dimensional memory device that includes the memory array 130 having a plurality of stacked memory chips.

Command signals, address signals, and write data signals may be provided to the memory 100 via a host interface bus 128. Similarly, read data signals may be provided from the memory 100 to a host via the host interface bus 128. The host interface bus 128 may be connected to an input/output (I/O) control unit 120. The I/O control unit 120 may be configured to route signals between the host interface bus 128, and an internal data bus 122 an internal address bus 124, and an internal command bus 126.

The memory 100 further includes a controller 110 that is configured to receive control signals, either directly or via the internal command bus 126. The controller 110 may be configured to control operation of the memory 100. The controller 110 may include an arithmetic logic unit (ALU) 111, a sequencer 112, random-access memory (RAM) 113, read-only memory (ROM) 114, an interrupter 115, and I/O logic 116. The ROM 114 may be configured to store instructions (e.g., microcode instructions) configured to be executed by the controller 110 to control operation of the memory 100. The RAM 113 may be configured to store volatile data received from the internal command bus 126 (e.g., the command signals, the address signals, write data signals, and/or read data signals) and/or program variables used during execution of the instructions stored at the ROM 114. The ALU 111 may be configured to perform binary arithmetic and/or logic operations on one or more of data received from the internal command bus 126 (e.g., the command signals, the address signals, write data signals, and/or read data signals), data stored at the ROM 114, data stored at the RAM 113, or combinations thereof. For example, the ALU 111 may be configured to perform binary addition, binary multiplication, binary division, shift operations, or other logical operations on binary data. In some examples, the ALU 111 may include arithmetic logic circuitry that is configured to selectively perform a binary addition operation on two received operands as part of an addition operation associated with the two received operands, or a binary addition operation on a partial product of the two received operands as part of a multiplication operation associated with the two received operands. An input to the addition logic circuitry may be controlled by a multiplexer, in some examples. The ALU 111 having the arithmetic logic circuitry that is configured to be used for both addition and multiplication operations may consume less space and power than an ALU that includes separate addition and multiplication logic circuitry.

In response to receipt of command signals and control signals, the sequencer 112 may be configured to control execution of instructions received from the ROM 114 according to an execution schedule. In some examples, the execution schedule may be based on a defined timing relationship, a data dependency relationship, a type of operation, a target row of the memory array 130, or other considerations. In some examples, the execution schedule may include sequential operations, parallel operations, or combinations thereof. The sequencer 112 may be configured to synchronize parallel execution pipelines, in some examples, such as setting and maintaining a start times of operation on parallel pipeline relative to another execution pipeline.

The interrupter 115 may be configured to manage interrupt signals that are configured to interrupt execution of instructions stored at the ROM 114. The interrupt signals may provide an interrupt in response to a command to perform a higher priority task, for example. The I/O logic 116 may be configured to control the I/O control unit 120, the row decoder 140, the column decoder 150, and the cache register 170 to perform management and access operations for the memory 100.

The address bus 124 applies block-row address signals to a row decoder 140 and column address signals to a column decoder 150. The row decoder 140 and column decoder 150 may be used to select blocks of memory or memory cells of the memory array 130 for memory operations, such as read, program, and erase operations. The column decoder 150 may enable write data signals to be applied to columns of memory corresponding to the column address signals and allow read data signals to be coupled from columns corresponding to the column address signals.

In response to the memory commands decoded by the controller 110, the memory cells in the array 130 may be read, programmed, or erased. Read, program, and erase circuits 168 coupled to the memory array 130 receive control signals from the controller 110. The read, program, and erase circuits 168 may include voltage generators for generating various pumped voltages for read, program and erase operations.

After the row address signals have been applied to the address bus 124, the I/O control unit 120 may route write data signals to a cache register 170. The write data signals may be stored in the cache register 170 in successive sets each having a size corresponding to the width of the host interface bus 128. The cache register 170 sequentially stores the sets of write data signals for an entire row or page of memory cells in the array 130. All of the stored write data signals are then used to program a row or page of memory cells in the memory array 130 selected by the block-row address coupled through the address bus 124. In a similar manner, during a read operation, data signals from a row or block of memory cells selected by the block-row address coupled through the address bus 124 are stored in a data register 180. Sets of data signals corresponding in size to the width of the host interface bus 128 are then sequentially transferred through the I/O control unit 120 from the data register 180 to the host interface bus 128.

Figure 2:
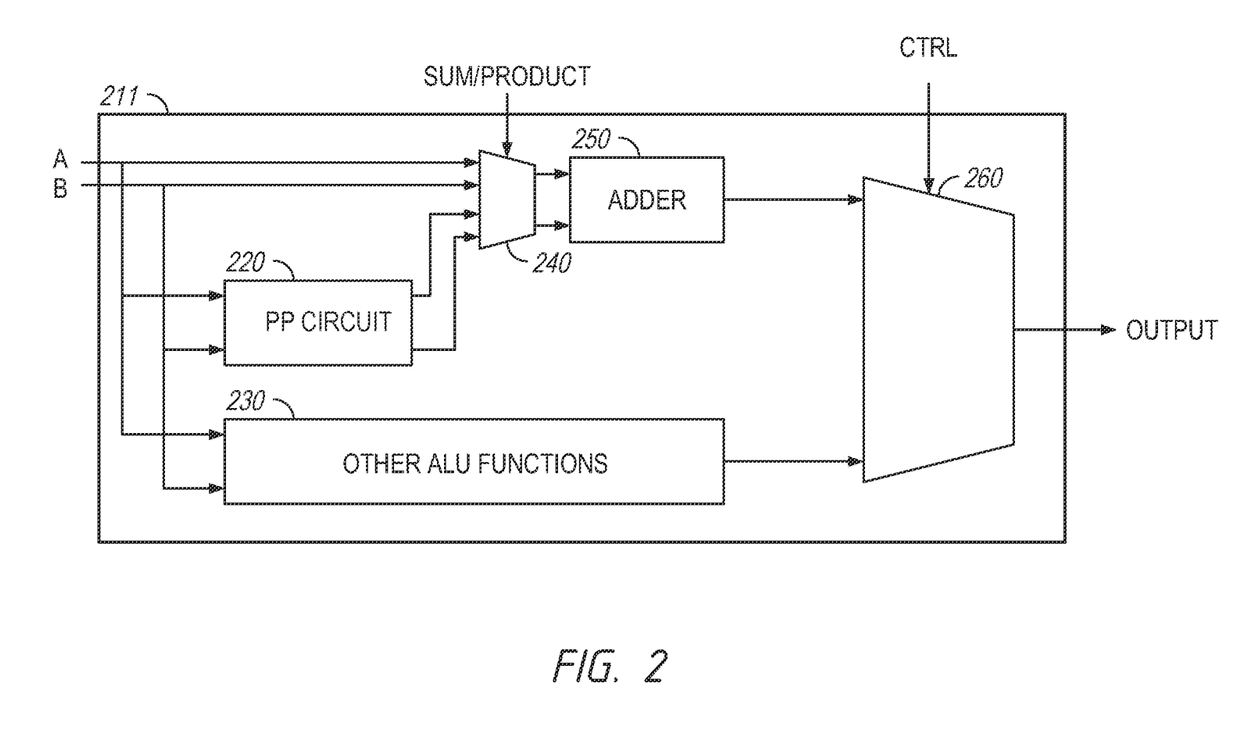
FIG. 2 is a block diagram of an ALU in accordance with an embodiment of the disclosure.

FIG. 2 is a block diagram of an ALU 211 in accordance with an embodiment of the disclosure. The ALU 211 includes a partial product circuit 220, a multiplexer 240, an adder circuit 250, other ALU functions 230, and a 260. The ALU 111 of FIG. 1 may implement the ALU 211, in some examples. The partial product circuit 220 may be configured to receive first signal A and second signal B and to perform a partial product multiplication and partial product addition based on the A signal and the B signal to provide two partial product operands. The partial product multiplication and the partial product addition may relate to binary arithmetic operations. The partial product circuit 220 may include logic circuits and adder circuits configured to perform the partial product multiplication and the partial product addition. The partial product circuit 220 may provide the partial product operands to the multiplexer 240.

The multiplexer 240 may be configured to receive the A signal operand and the B signal operand in parallel with the partial product operands received from the partial product circuit 220. The multiplexer 240 may be configured to provide one of the A and B signal operands or the partial product operands provided from the partial product circuit 220 to the adder circuit 250 as the addition operands. The adder circuit 250 may be configured to perform a binary addition operation on the addition operands received from the multiplexer 240 to provide a sum to the 260. In some examples, the ALU 211 may include the other ALU functions 230 that are configured to perform other arithmetic operations on the A signal and the B signal in parallel with the partial product circuit 220, the multiplexer 240, and the adder circuit 250, such as logical comparisons, shifts, etc., and provide the results to the 260. Based on the target operation controlled by the control signal CTRL, the 260 may be configured to provide an output signal based on the output of the adder circuit 250 or the output of one of the other ALU functions 230.

In operation, the ALU 211 may be configured to receive the A signal and the B signal. The A signal and the B signal may each include a plurality of bits that collectively form respective operands. The ALU 211 may further receive the CTRL signal and the sum/product control signal that are used to control the operation performed on the A signal operand and the B signal operand. In response to the CTRL signal having a first value, the 260 may provide an output of one of the other ALU functions 230 as the output signal. In response to the CTRL signal having a second value, the 260 may be configured to provide the output of the adder circuit 250 as the output signal.

The sum/product signal may control whether the output of the adder circuit 250 is a product of the A signal operand and the B signal operand or a sum of the A signal operand and the B signal operand. In response to the sum/product signal having a first value indicating a sum, the multiplexer 240 may provide the A signal operand and the B signal operand directly to the adder circuit 250, and the adder circuit 250 may perform a binary addition operation on the A signal operand and the B signal operand to provide a sum of the A signal operand and the B signal operand to the 260. In response to the sum/product signal having a second value indicating a product, the multiplexer 240 may provide the partial product operands received from the partial product circuit 220 to the adder circuit 250, and the adder circuit 250 may perform a binary addition operation on the partial product operands received from the partial product circuit 220 to provide a resultant product of the A signal operand and the B signal operand to the 260. The partial product circuit 220 may determine the partial product operands by performing binary multiplication and addition on parts of the A signal operand and the B signal operand. A size or width of the adder circuit 250 may be based on a count of bits in the A signal operand and/or the B signal operand. For example, if each of the A signal and/or B signal operands have four bits (e.g., or n bits), the partial product operands may include up to 7 bits (e.g., or 2n−1 bits), including 6 overlapping bits to be added and a least significant bit partial product to be passed through) to provide a product having up to 8 bits (e.g., or 2n bits), including a carry bit as the most-significant bit. A bitwise multiplication operation may include a bitwise AND operation between two bits to provide a partial product. The partial product circuit 220 may be configured to perform partial product addition operations to on select subsets of partial products to provide the two partial product operands at an output. The partial product multiplication and the partial product addition may relate to binary operations.

Based on the target operation controlled by the control signal CTRL, the 260 may be configured to provide an output signal based on the output of the adder circuit 250 or the output of one of the other ALU functions 230. By sharing the adder circuit 250 for both addition and multiplication operations, the ALU 211 may consume less space and power than an ALU that includes separate addition and multiplication logic circuitry.

Figure 3:
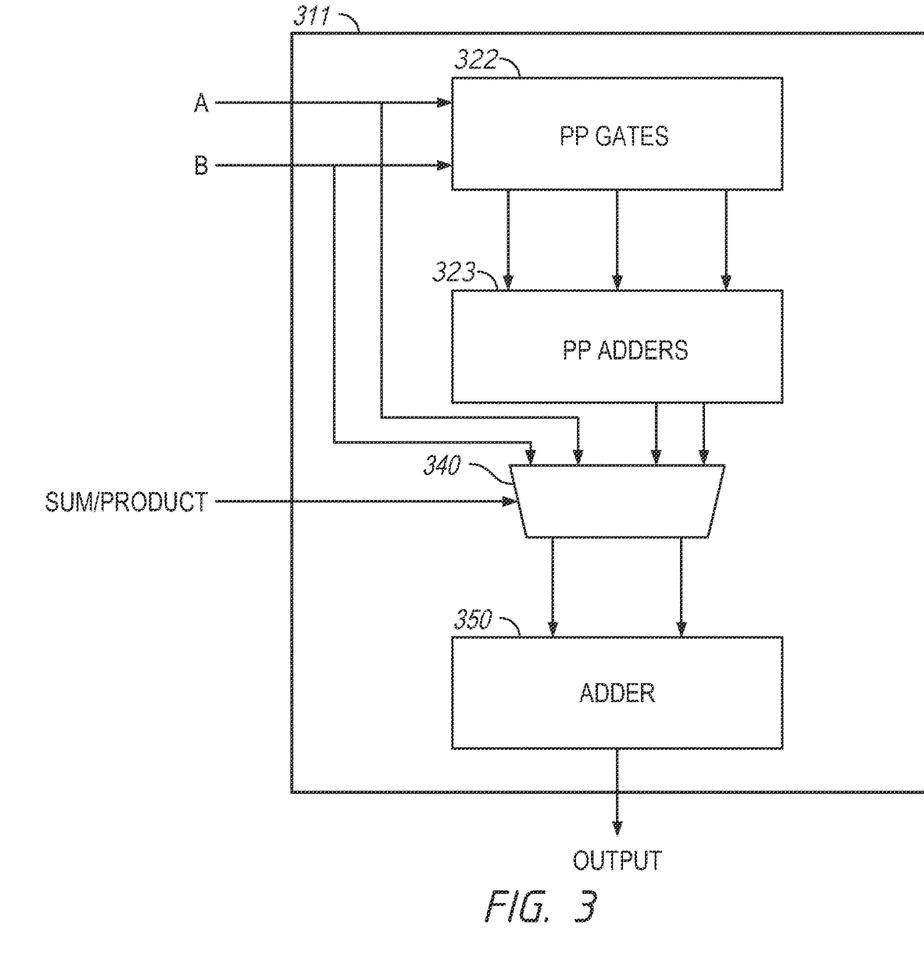
FIG. 3 is a block diagram of an ALU in accordance with an embodiment of the disclosure.

FIG. 3 is a block diagram of an ALU 311 in accordance with an embodiment of the disclosure. The ALU 311 includes a partial product gates 322, a partial product adders 323, a multiplexer 340, and adder circuit 350. The ALU 111 of FIG. 1 and/or the ALU 211 of FIG. 2 may implement the ALU 311, in some examples. The partial product circuit 220 may be configured to receive first signal A operand and second signal B operand and to perform a partial product multiplication based on the A signal operand and the B signal operand. The partial products may be provided to the partial product adders 323. The partial product adders 323 may be configured to perform partial product addition operations using some of the partial products provided from the partial product gates 322 to provide two partial product operands to the multiplexer 340. The partial product multiplication and the partial product addition may relate to binary arithmetic operations. The partial product gates 322 and the partial product adders 323 may include logic circuits and adder circuits configured to perform the partial product multiplication and the partial product addition.

The multiplexer 340 may be configured to receive the A signal operand and the B signal operand in parallel with the partial product operands received from the partial product adders 323. The multiplexer 340 may be configured to provide one of the A and B signal operands or the partial product operands provided from the partial product adders 323 to the adder circuit 350 as addition operands based on the sum/product control signal. The sum/product control signal may indicate whether the intended operation is an addition operation based on the A and B signal operands (e.g., a sum) or a multiplication operation based on the A and B signal operands (e.g., a product). In response to the sum/product control signal having a first value indicating a sum, the multiplexer 340 may be configured to provide the A and B signal operands to the adder circuit 350 as the addition operands. In response to the sum/product control signal having a second value indicating a product, the multiplexer 340 may be configured to provide the partial product operands received from the partial product adders 323 to the adder circuit 350 as the addition operands. The adder circuit 350 may be configured to perform a binary addition operation on the addition operands received from the multiplexer 340 to provide a sum or a product based on the sum/product control signal.

In operation, the ALU 311 may be configured to receive the A signal and the B signal. The A signal and the B signal may each include a plurality of bits that collectively form respective operands. The sum/product signal may control whether the output of the adder circuit 350 is a product of the A signal operand and the B signal operand or a sum of the A signal operand and the B signal operand. In response to the sum/product signal having a first value indicating the sum, the multiplexer 340 may provide the A signal operand and the B signal operand directly to the adder circuit 350, and the adder circuit 350 may perform a binary addition operation on the A signal operand and the B signal operand to provide a sum of the A signal operand and the B signal operand at an output. In response to the sum/product signal having a second value indicating a product, the multiplexer 340 may provide the partial product operands received from the partial product adders 323 to the adder circuit 350, and the adder circuit 350 may perform a binary addition operation on the partial product operands received from the partial product adders 323 to provide a resultant product of the A signal operand and the B signal operand at an output. Together, the partial product gates 322 and the partial product adders 323 may determine the partial product operands by performing binary multiplication and binary addition on bits of the A signal operand and the B signal operand. A size or width of the adder circuit 350 may be based on a count of bits in the A signal operand and/or the B signal operand. For example, if each of the A signal and/or B signal operands have n bits (e.g., wherein n is an integer value greater than 1), the partial product operands may include up to 2n−1 bits, including 2n−2 overlapping bits to be added together and one least significant bit partial product to be passed through, to provide a product having up to 2n bits, including a carry bit as the most-significant bit. A bitwise multiplication operation may include a bitwise AND operation between two bits to provide a partial product. The partial product adders 323 may be configured to perform partial product addition operations to on select subsets of partial products to provide the two partial product operands at an output. The partial product multiplication and the partial product addition may relate to binary operations.

By sharing the adder circuit 350 for both addition and multiplication operations, the ALU 311 may consume less space and power than an ALU that includes separate addition and multiplication logic circuitry.

Figure 4A:
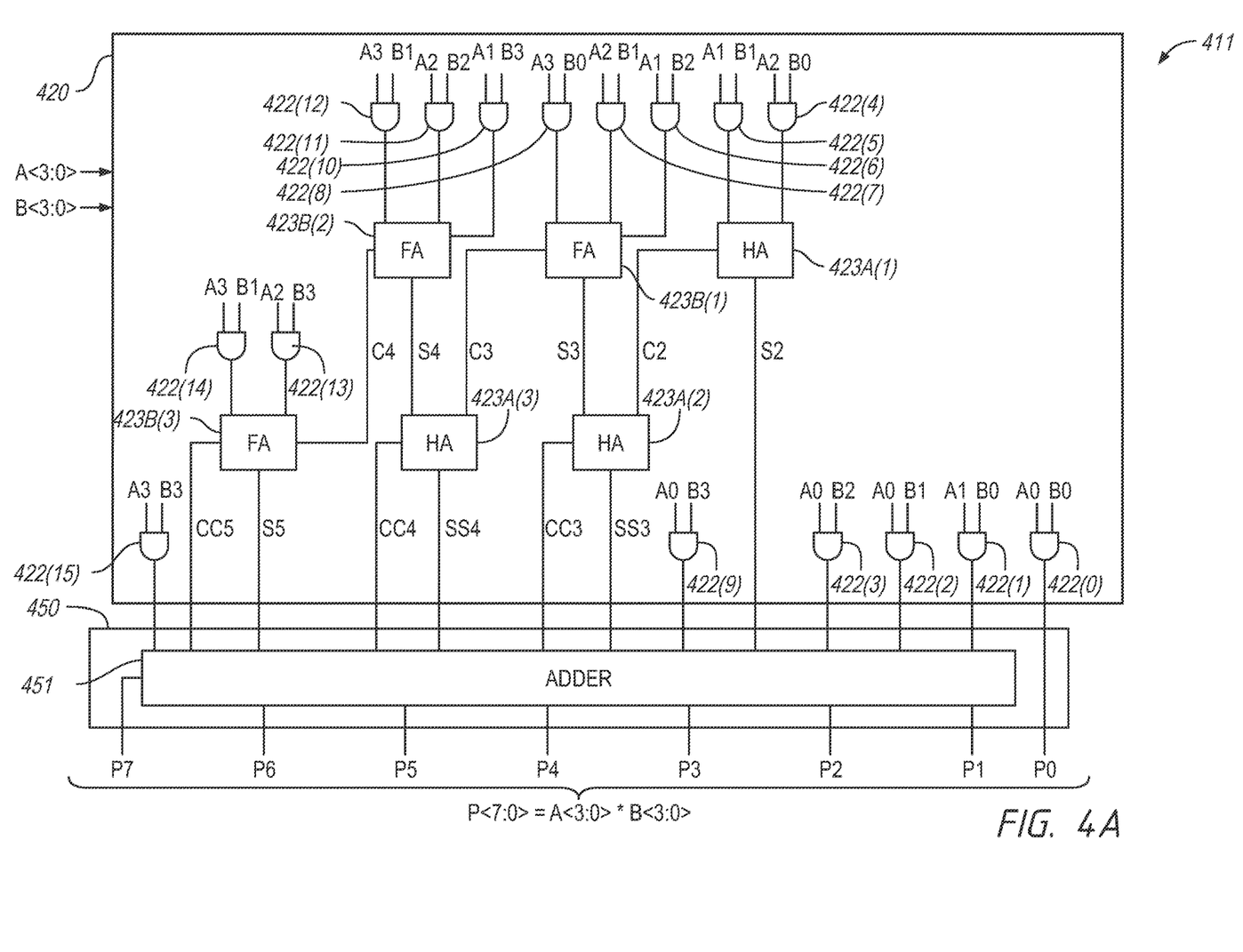
FIG. 4A is a block diagram of a diagram of an exemplary ALU in accordance with an embodiment of the disclosure.
Figure 4B:
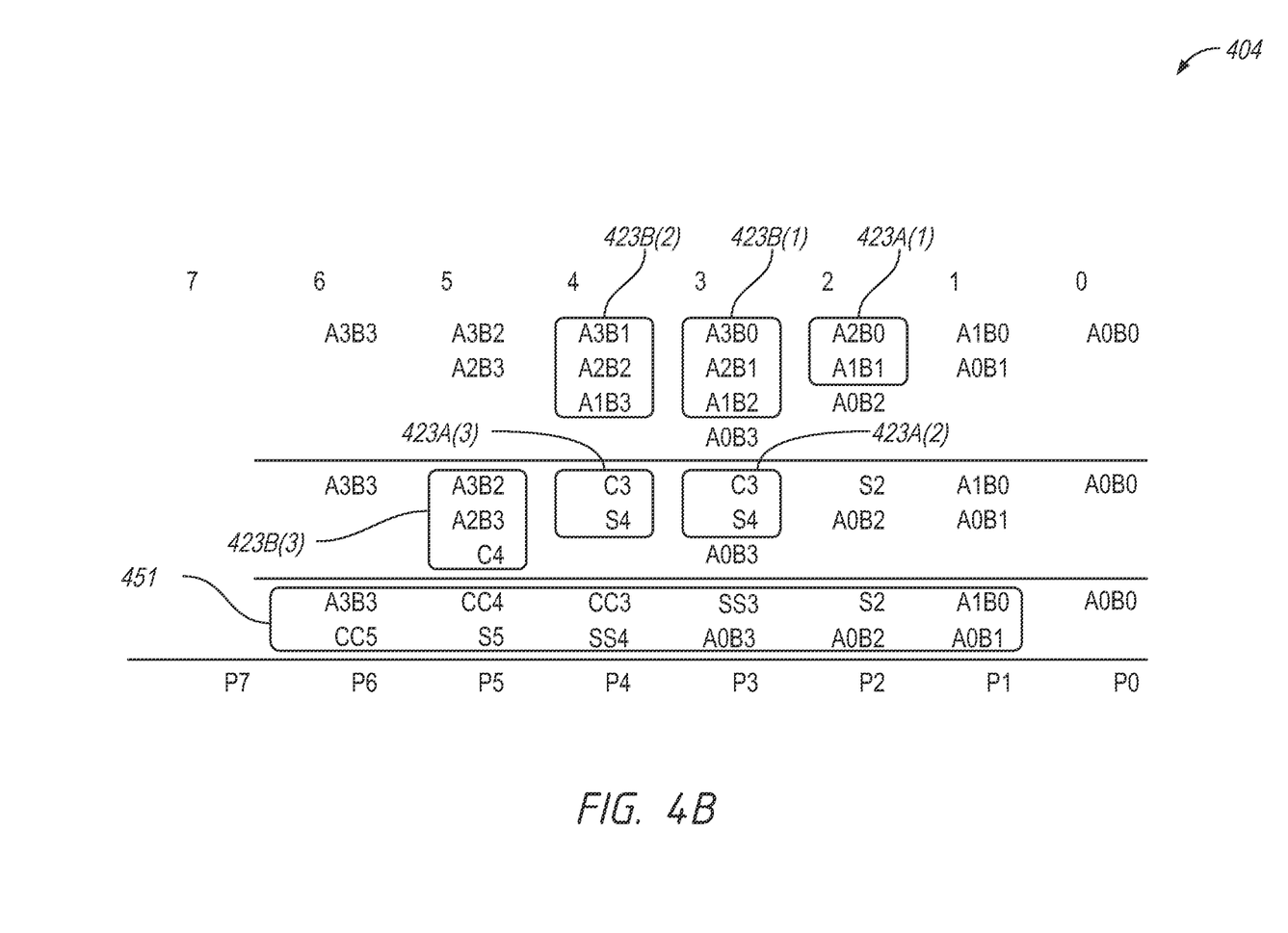
FIG. 4B is an exemplary table to depicting derivation of a product via an ALU in accordance with an embodiment of the disclosure.
Figure 4C:
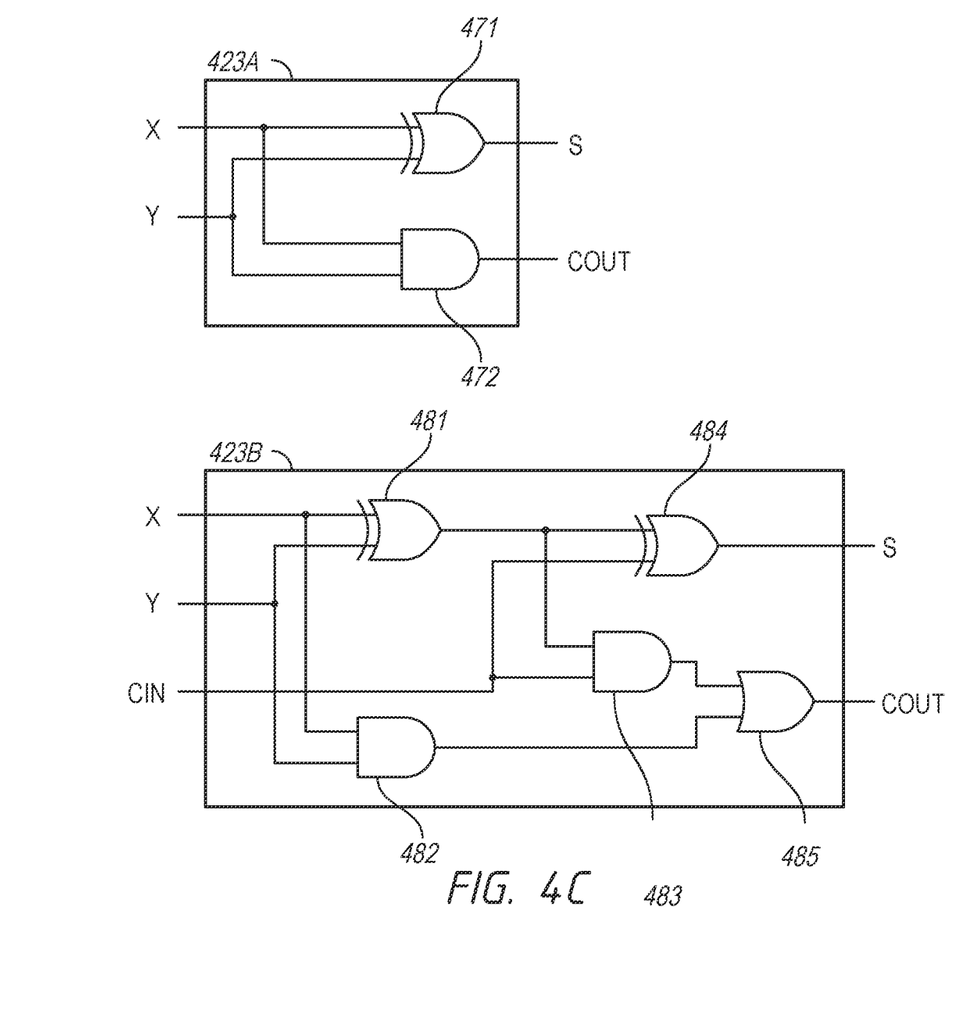
FIG. 4C includes a logic diagram of an example half adder and an example full adder in accordance with an embodiment of the disclosure.

FIGS. 4A-4C provide exemplary logic diagrams and tables for partial product and partial product addition operations to provide two partial product operands to a shared adder circuit. FIG. 4A is a block diagram of a diagram of an exemplary ALU 411 in accordance with an embodiment of the disclosure. The ALU 411 includes a partial product circuit 420 coupled to an adder circuit 450 to provide a product P<7:0> of a first input signal A<3:0> and a second input signal B<3:0>. While logic circuitry to perform a multiplication operation is depicted in FIG. 4A, it is appreciated that the ALU 411 may include circuitry to perform other arithmetic-related operations without departing from the scope of the disclosure. In addition, for clarity, the ALU 411 is shown in FIG. 4A as being directly coupled to the adder circuit 450 However, the ALU 411 may include a multiplexer coupled between the partial product circuit 420 and the adder circuit 450, similar to the multiplexer 240 of FIG. 2 or the multiplexer 340 of FIG. 3, without departing from the scope of the disclosure. The ALU 111 of FIG. 1, the ALU 211 of FIG. 2, and/or the ALU 311 of FIG. 3 may implement the ALU 411, in some examples.

The partial product circuit 420 may include partial product gates 422(0)-(15), half adders 423A(1)-(3), and full adders 423B(1)-(3) that are collectively configured to provide partial product operands to the adder circuit 450. Each of the partial product gates 422(0)-(15) may include logic gates configured to perform bitwise AND logic between respective bits of the A<3:0> and B<3:0> signals to provide respective partial products. Each of the half adders 423A(1)-(3) may be configured to perform a bitwise addition operation based on two respective input bits to provide a sum bit and a carry bit at an output. FIG. 4C includes a logic diagram of an example half adder 423A in accordance with an embodiment of the disclosure. Each of the half adders 423A(1)-(3) may implement the half adder 423A of FIG. 4C, in some examples. The half adder 423A may include an exclusive OR (XOR) gate 471 and an AND gate 472. The XOR gate 471 may be configured to receive an X bit and a Y bit and to provide a sum bit S based on the X bit and the Y bit using XOR logic. The AND gate 472 may be configured to receive the X bit and the Y bit and to provide a carry out bit COUT based on the X bit and the Y bit using AND logic.

Each of the full adders 423B(1)-(3) may be configured to perform a bitwise addition operation based on a carry input bit and two other input bits to provide a sum bit and a respective carry output bit at an output. FIG. 4C includes a logic diagram of an example full adder 423B in accordance with an embodiment of the disclosure. Each of the full adders 423B(1)-(3) may implement the full adder 423B of FIG. 4C in some examples. The full adder 423B may include an XOR gate 481, an AND gate 482, an AND gate 483, an XOR gate 484, and an OR gate 485. The XOR gate 481 may be configured to receive an X bit and a Y bit, and to provide a first input bit to the AND gate 483 and a first input bit to the XOR gate 484 based on the X bit and the Y bit using XOR logic. The AND gate 482 may be configured to receive the X bit and the Y bit and to provide first input bit to the OR gate 485 based on the X bit and the Y bit using AND logic. The AND gate 483 may be configured to receive a carry in bit CIN and the output of the XOR gate 481 and to provide a second input bit to the OR gate 485 based on the CIN bit and the output of the XOR gate 481 using AND logic. The XOR gate 484 may be configured to receive the CIN bit and the output of the XOR gate 481, and to provide a sum bit S based on the CIN bit and the output of the XOR gate 481 using XOR logic. The OR gate 485 may be configured to provide a carry out bit COUT based on the output of the AND gate 482 and the output of the AND gate 483 using OR logic.

The adder circuit 450 may include an adder 451. The adder 451 may include one or more of the half adders 423A of FIG. 4C, one or more of the full adders 423B of FIG. 4C, or any combination thereof that are configured to provide the P<7:1> bits based on the sum of the two partial product operands provided by the partial product circuit 420.

In operation, the partial product circuit 420 and the adder circuit 450 of the ALU 411 may be configured to provide the product P<7:0> of the A<3:0> and B<:0> signals. Specifically, the partial product circuit 420 may be configured to provide two partial product operands to the adder circuit 450 based on the A<3:0> and B<:0> signals, and the adder circuit 450 is configured to add the two partial product operands to provide the product P<7:0>. FIG. 4B is an exemplary table 404 to depicting derivation of the product P<7:0> of the A<3:0> and B<:0> signals via the ALU 411 in accordance with an embodiment of the disclosure.

The first partial product operand includes partial product bit A0B0 (e.g., via the partial product gate 422(0)), partial product bit A1B0 (e.g., via the partial product gate 422(1)), sum bit S2 (e.g., via the partial product gates 422(4) and (5) and the half adder 423A(1)), sum bit SS3 (e.g., via the carry bit C2 from the half adder 423A(1), the partial product gates 422(6)-(8), the full adder 423B(1), and the half adder 423A(2)), carry bit CC3 (e.g., via the carry bit C2 from the half adder 423A(1), the partial product gates 422(6)-(8), the full adder 423B(1), and the half adder 423A(2)), carry bit CC4 (e.g., via the carry bit C3 from the full adder 423B(1), the partial product gates 422(10)-(12), the full adder 423B (2), and the half adder 423A(3)), and partial product A3B3 (e.g., via the partial product gate 422(15)).

The second partial product operand includes an empty bit, partial product bit A0B1 (e.g., via the partial product gate 422(2)), partial product bit A0B2 (e.g., via the partial product gate 422(3)), partial product bit A0B3 (e.g., via the partial product gate 422(9)), sum bit SS4 (e.g., via the carry bit C3 from the full adder 423B(1), the partial product gates 422(9)-(11), the full adder 423B(2), and the half adder 423A(3)), sum bit S5 (e.g., via the carry bit C4 from the full adder 423B(2), the partial product gates 422(13) and (14), and the full adder 423B(3)), and carry bit CC5 (e.g., via the carry bit C4 from the full adder 423B(2), the partial product gates 422(13) and (14), and the full adder 423B(3)).

The adder circuit 450 may perform a bitwise addition operation to add the first partial product operand (e.g., bit 0-A0B0, bit 1-A1B0, bit 2-S2, bit 3-SS3, bit 4-CC3, bit 5-CC4, bit 6-A3B3) to the second partial product operand (e.g., bit 0-empty bit, bit 1-A0B1, bit 2-A0B2, bit 3-A0B3, bit 4-SS4, bit 5-S5, bit 6-CC5). The first operand bit 0 (e.g., A0B0) may be passed through the adder circuit 450 as the product bit P0. The adder 451 may be configured to add the remaining bits of the first and second operands to provide the product bits P<7:1>, with the product bit P<7> being a carry bit. The ALU 411 depicted in FIGS. 4A-4C includes example logic to perform multiplication with up to 4-bit operands. It is appreciated that additional circuitry may be included to expand to multiplication operands having more than 4 bits without departing from the scope of the disclosure. In addition, the logic depicted in FIGS. 4A-4C is exemplary. It is also appreciated that different logic circuits may be implemented in the ALU 411 to perform 4-bit operand multiplication without departing from the scope of the disclosure.

From the foregoing it will be appreciated that, although specific embodiments of the disclosure have been described herein for purposes of illustration, various modifications may be made without deviating from the spirit and scope of the disclosure.

What is claimed is:

1. A memory comprising:
an arithmetic logic unit (ALU) comprising an adder circuit and is configured to determine partial product operands based on received first and second operands by comparing respective bits of the first operand and the second operand, wherein the ALU is further configured to, in response to receiving a sum/product control signal indicating a multiplication operation command, controlling a multiplexer to provide the partial product operands to the adder circuit and the adder circuit is configured to provide an output that is a product of the first operand and the second operand, wherein, the ALU is further configured to, in response to receiving the sum/product control signal indicating an addition operation command, controlling the multiplexer to provide the first operand and the second operand to the adder circuit and the adder circuit is configured to provide a sum of the first operand and the second operand.

2. The memory of claim 1, wherein the ALU is configured to use bitwise AND logic to compare the respective bits of the first operand and the second operand to determine the partial product bits.

3. The memory of claim 1, wherein the ALU is configured to add two of the partial product bits to determine the partial product operands based on the first operand and the second operand.

4. The memory of claim 1, wherein the ALU is configured to add three of the partial product bits to determine the partial product operands based on the first operand and the second operand.

5. The memory of claim 1, wherein the ALU is configured to provide an output of the adder circuit at an output in response to receipt of either the addition command or the multiplication command.

6. The memory of claim 1, wherein the ALU comprises a multiplexer that is configured to receive the partial product operands and the first operand and the second operand, wherein the multiplexer is configured to provide the partial product operands to the adder circuit during the multiplication operation and to provide the first operand and the second operand to the adder circuit during the addition operation.

7. The memory of claim 1, wherein the ALU comprises a partial product circuit configured to receive the first operand and the second operand and to determine the partial product operands based on the first operand and the second operand.

8. The memory of claim 7, wherein the partial product circuit comprises a partial product gate configured to receive a respective bit of the first operand and a respective bit of the second operand and to determine a respective partial product bit of the partial product operands based on the respective bit of the first operand and the respective bit of the second operand.

9. The memory of claim 7, wherein the partial product circuit comprises a half adder circuit configured to receive two respective partial product bits received from partial product gates and to determine a sum bit and a carry bit based on the respective partial product bits, wherein the partial product operands are based on the sum bit and the carry bit.

10. The memory of claim 7, wherein the partial product circuit comprises a full adder circuit configured to receive three respective partial product bits received from partial product gates and to determine a sum bit and a carry bit based on the respective partial product bits, wherein the partial product operands are based on the sum bit and the carry bit.

11. The memory of claim 1, further comprising a controller that includes the ALU, wherein the controller is configured to manage memory access operations based on the first and second operands.

12. The memory of claim 1, further comprising a memory array configured to store data corresponding to the first and second operands.

13. An apparatus comprising:
an arithmetic logic unit (ALU) comprising an adder circuit and a partial product circuit, wherein the partial product circuit is configured to determine first and second partial product operands based on received first and second operands by comparing respective bits of the first and second operands at a first partial product gate and a second partial product gate to provide partial product bits, wherein the partial product circuit further comprises a half adder circuit configured to receive the respective partial product bits from the first and second partial product gates and to provide a sum bit and a carry bit, wherein the partial product operands are based on the sum bit and the carry bit, wherein the adder circuit is configured to sum the first and second operands during an addition operation and to sum the partial product operands during a multiplication operation, wherein the partial product circuit comprises an additional plurality of partial product gates each configured to provide a respective partial product bit based on a respective bit of the first received operand and a respective bit of the second received operand, wherein the partial product operands are based on the respective partial product bit provided by each of the additional plurality of partial product gates, wherein a partial product gate of the additional plurality of partial product gates includes a NAND logic gate configured to perform a bitwise NAND operation between the respective bit of the first operation and the respective bit of the second operand.

14. The apparatus of claim 13, wherein the ALU comprises a multiplexer is configured to provide the partial product operands to the adder circuit in response to the multiplication operation and to provide the first received operand and the second received operand to the adder circuit in response the addition operation.

15. The apparatus of claim 13, wherein the partial product circuit further comprises an adder circuit configured to receive the respective partial product bits from at least two of the additional plurality of partial product gates and to determine a respective sum bit and a respective carry bit, wherein the partial product operands are based on the respective sum bit and the respective carry bit.

16. The apparatus of claim 15, wherein the adder circuit includes a second half adder circuit configured to determine the respective sum bit and the respective carry bit based on two respective partial product bits.

17. The apparatus of claim 15, wherein the adder circuit includes a full adder circuit configured to determine the respective sum bit and the respective carry bit based on three respective partial product bits.

18. The apparatus of claim 13, wherein the ALU further includes circuitry to perform a shift operation using the first received operand and the second received operand.

* * * * *